US010271513B2

(12) United States Patent
Baiocchi (10) Patent No.: US 10,271,513 B2
(45) Date of Patent: Apr. 30, 2019

(54) CLOSED LITTER BOX FOR PETS (71) Applicant: BAMA S.P.A., Altopascio (IT)

(72) Inventor: Renzo Baiocchi, Montecarlo (IT)

(73) Assignee: BAMA S.P.A., Altopascio (IT)

( * ) Notice: Subject to any disclaimer, the term of this patent is extended or adjusted under 35 U.S.C. 154(b) by 179 days.

(21) Appl. No.: 15/364,128

(22) Filed: Nov. 29, 2016

(65) Prior Publication Data

US 2017/0164577 A1 Jun. 15, 2017

(30) Foreign Application Priority Data

Dec. 9, 2015 (IT) .................. 102015000042706

(51) Int. Cl.
*A01K 1/01* (2006.01)
*A01K 1/02* (2006.01)

(52) U.S. Cl.
CPC ............ *A01K 1/0114* (2013.01); *A01K 1/011* (2013.01); *A01K 1/0107* (2013.01); *A01K 1/02* (2013.01)

(58) Field of Classification Search
CPC ..... A01K 1/0107; A01K 1/011; A01K 1/0114
USPC .......................................... 119/161, 165, 166
See application file for complete search history.

(56) References Cited

U.S. PATENT DOCUMENTS

| 5,713,302 | A | 2/1998 | Walter |
| 5,794,566 | A | 8/1998 | Goetz et al. |
| 6,295,949 | B1 * | 10/2001 | Willis .................. A01K 1/0114 119/165 |
| 8,109,237 | B1 * | 2/2012 | Tsengas ............... A01K 1/0114 119/166 |
| 2008/0022938 | A1 | 1/2008 | Callan |
| 2009/0272327 | A1 | 11/2009 | Plante |
| 2011/0297096 | A1 * | 12/2011 | Northrop ............. A01K 1/0107 119/165 |
| 2015/0122189 | A1 * | 5/2015 | Sweetman .......... A01K 1/0107 119/165 |
| 2015/0167265 | A1 | 6/2015 | Becattini, Jr. et al. |
| 2015/0320008 | A1 * | 11/2015 | Northrop ............. A01K 1/0107 119/165 |

FOREIGN PATENT DOCUMENTS

DE 102009058037 A1 6/2011

* cited by examiner

*Primary Examiner* — Lisa L Tsang
(74) *Attorney, Agent, or Firm* — Harness, Dickey & Pierce, P.L.C.

(57) ABSTRACT

A closed litter box for pets including at least one lower module configured for containing granular material for the collection of excrement products. At least one upper module is coupled to the lower module. The closed litter box may be carried by at least one handle at the upper module. A collector for collecting excrement is also included. The handle includes at least a portion of the collector when the collector is placed in an excavated region of the upper module.

8 Claims, 8 Drawing Sheets

CLOSED LITTER BOX FOR PETS

BACKGROUND

Technical Field

The present invention is related to a closed litter box for pets.

Description of the Related Art

As it is known, for hygienic collection of droppings of domestic animals, usually cats, trays containing an absorbent granular material commonly called litter are generally used.

Traditional containers for litter are normally constituted by a tray having at the bottom a layer of granular material intended to absorb and incorporate the pet excrement. This granular material, usually sand or clay, should be regularly replaced with clean granular material.

The containers mainly used for this purpose are trays or boxes that can be easily emptied, cleaned and filled with clean granular material.

It is also well known that, especially when the litter must be arranged inside a domestic environment it is useful that the structure of the container for the litter is closed, so as not to disperse unpleasant odors or the granular material contained in it.

Since the hygienic aspect becomes particularly important when these containers are arranged within houses or apartments, litter boxes that have a substantially closed structure, formed by a lower part intended to contain the granular material and by a removable cover, have been developed.

As it is also known, there are different types of litter boxes for pets, for example cats, that can be moved through the use of a suitable handle integrated in the litter box.

For example, the patent application US 2008/0022938 describes a portable litter box comprising a bottom portion mounted on a pair of wheels and an upper portion which can be fixed to the lower one, provided with a pivoting door to allow the input and the output of the animal, and an extensible handle hinged to the litter box structure to facilitate transportation and lockable in the upper portion when not used.

Even the patent application US 2009/00272327 describes a litter box for cats with a base, a removable lid, a pivoting door and a handle hinged on the lid.

It is also known that, for the use and the regular cleaning of the litter, accessories such as a shovel and the bags for the collection of excrement are necessary.

This necessity implies problems of bulk and of practicality, but also hygienic problems because each of these cleaning devices, the litter box, the shovel and the bags, inevitably coming into contact with the excrement, should be maintained as much as possible isolated to avoid the risk of contamination of other household items.

As described in the U.S. Pat. No. 5,794,566, the known litter boxes may include shovels dedicated to the cleaning of the same litter, and in particular of its lower portion.

However, not all the known litter boxes are bulky and full of accessories included in the litter boxes which encumbers its structure and increase the cost.

BRIEF SUMMARY

The object of the present invention is to provide a closed litter box for pets which allows, in practical and economic way, to overcome the limitations presented by the heretofore known litter boxes.

In particular object of the present invention is to provide a closed litter box for pets which has a simple, compact, regular and easily openable structure.

A further object of the present invention is to provide a closed litter box for pets that can hollow a shovel of bags for the collection of the excrements, without increasing the overall dimensions of the litter box.

In particular, object of the present invention is to provide a closed litter box for pets that integrates in its structure the accessory devices for the cleaning of the litter.

Still object of the present invention is to provide a closed litter box for pets to avoid the dispersion of odors emanating from the litter for domestic animals.

According to the present invention, a closed litter box for pets is provided, as defined in claim 1.

BRIEF DESCRIPTION OF THE SEVERAL VIEWS OF THE DRAWINGS

For a better understanding of the present invention it is now described a preferred embodiment, purely by way of non-limiting example, with rifer the chin to the accompanying drawings, in which.

DETAILED DESCRIPTION

Figure 1A:
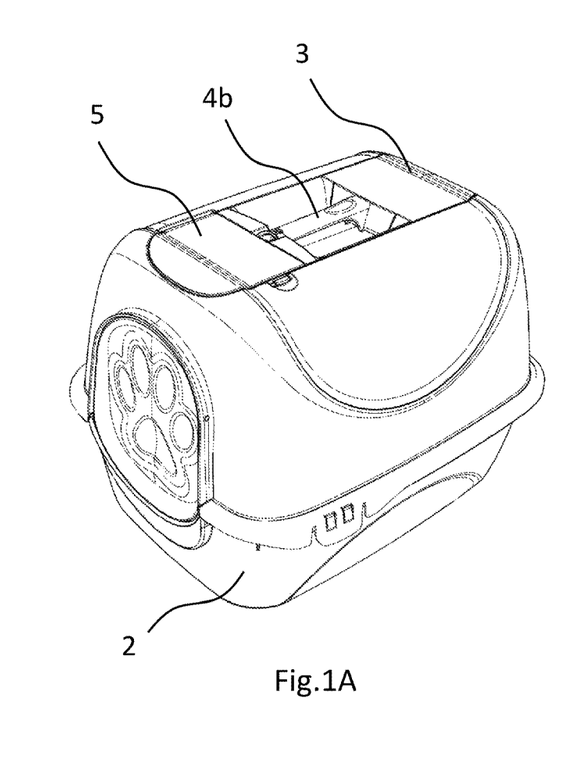
FIGS. 1A-1B show schematic overall three-dimensional views of a closed litter box for pets, according to the invention.
Figure 1B:
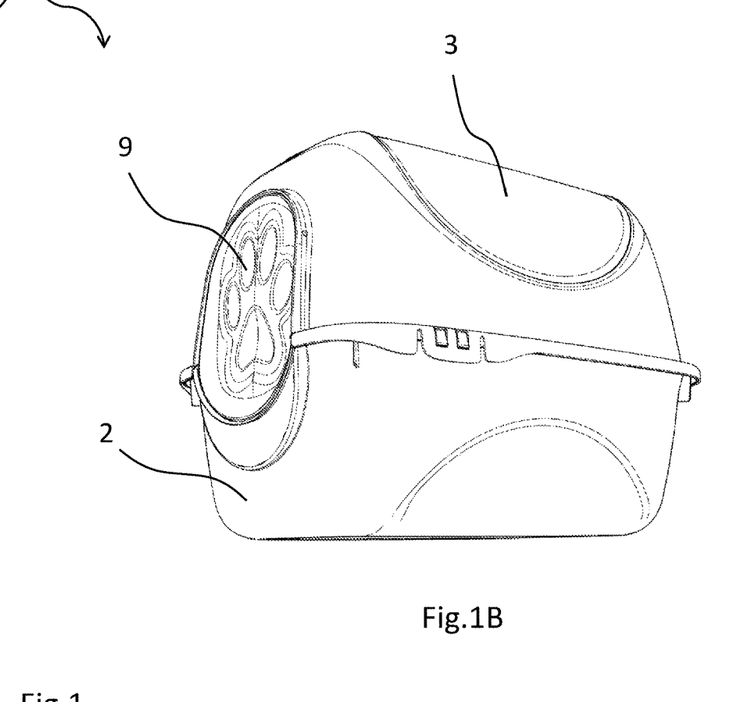

With reference to this figures and, in particular, to FIG. 1, a closed litter box for pets is shown, according to the invention. More in details, the closed litter box for pets 1 comprises a lower module 2 and an upper module 3 configured to be coupled together, for example configured to be latch locked. More precisely, the lower module 2 is used to physically accommodate the animal and to accept the appropriate granular material which has the function of absorbing the excrements and to limit odors. The upper module 3 is configured to close the lower module 2 and to support a plurality of accessories useful to the proper cleaning of the lower module 2 and to transport the entire litter box 1.

Figure 7:
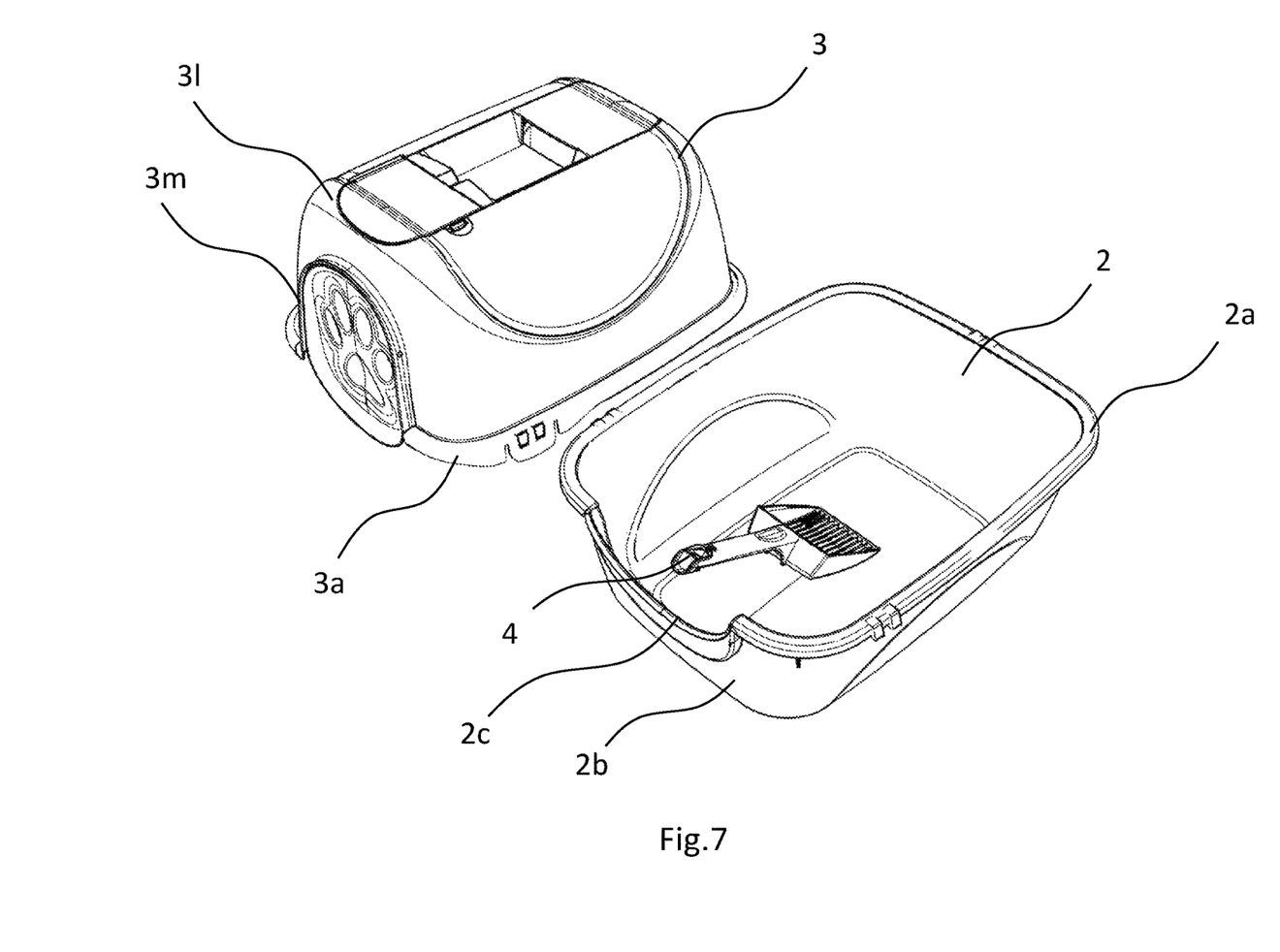
FIG. 7 shows a three-dimensional schematic view of the upper portion decoupled by a lower portion of the litter box dedicated to collect the animal excrements to be removed by the shovel of FIG. 6 extracted from the upper portion, according to the invention.
Figure 8A:
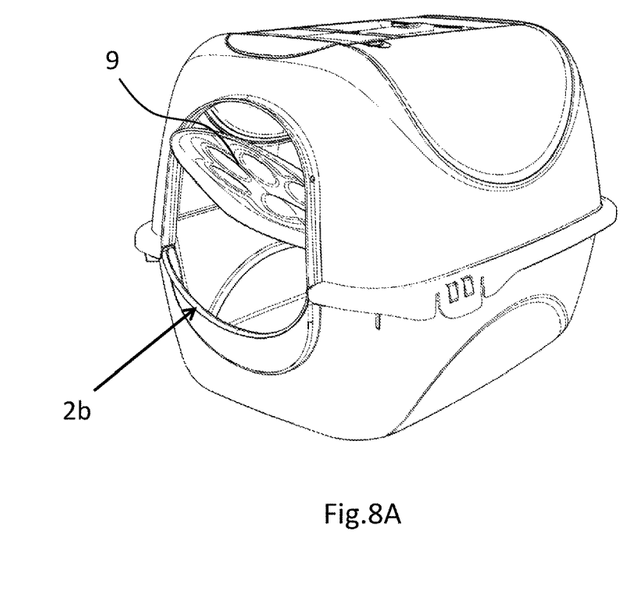
FIGS. 8A-8B show three-dimensional schematic views of the closed litter box for pets respectively in a configuration of input and of output of the animal, according to the invention.
Figure 8B:
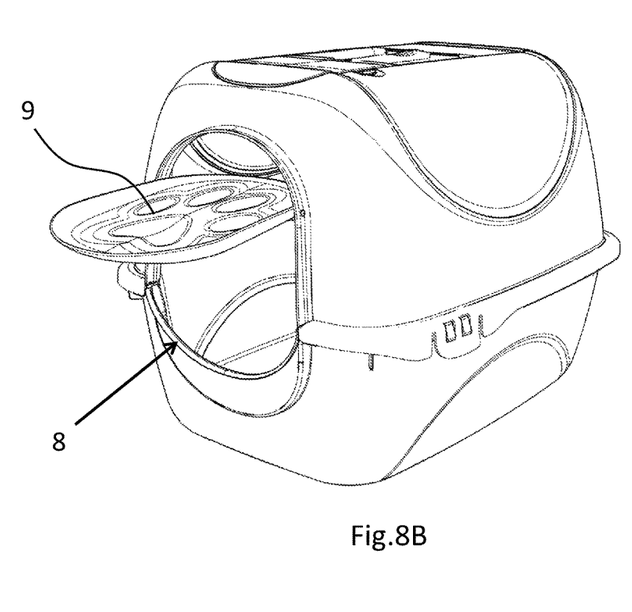

Advantageously according to the invention, the lower module 2 has an upper edge 2a, best shown in FIG. 7, having a shape designed so as to be mirror image in negative of a shaping in the bottom edge 3a of the upper module 3. In this way, it is possible to latch lock the lower edge 3a of the upper module 3 on the upper edge 2a of the lower module 2, as shown in FIG. 1.

Figure 2:
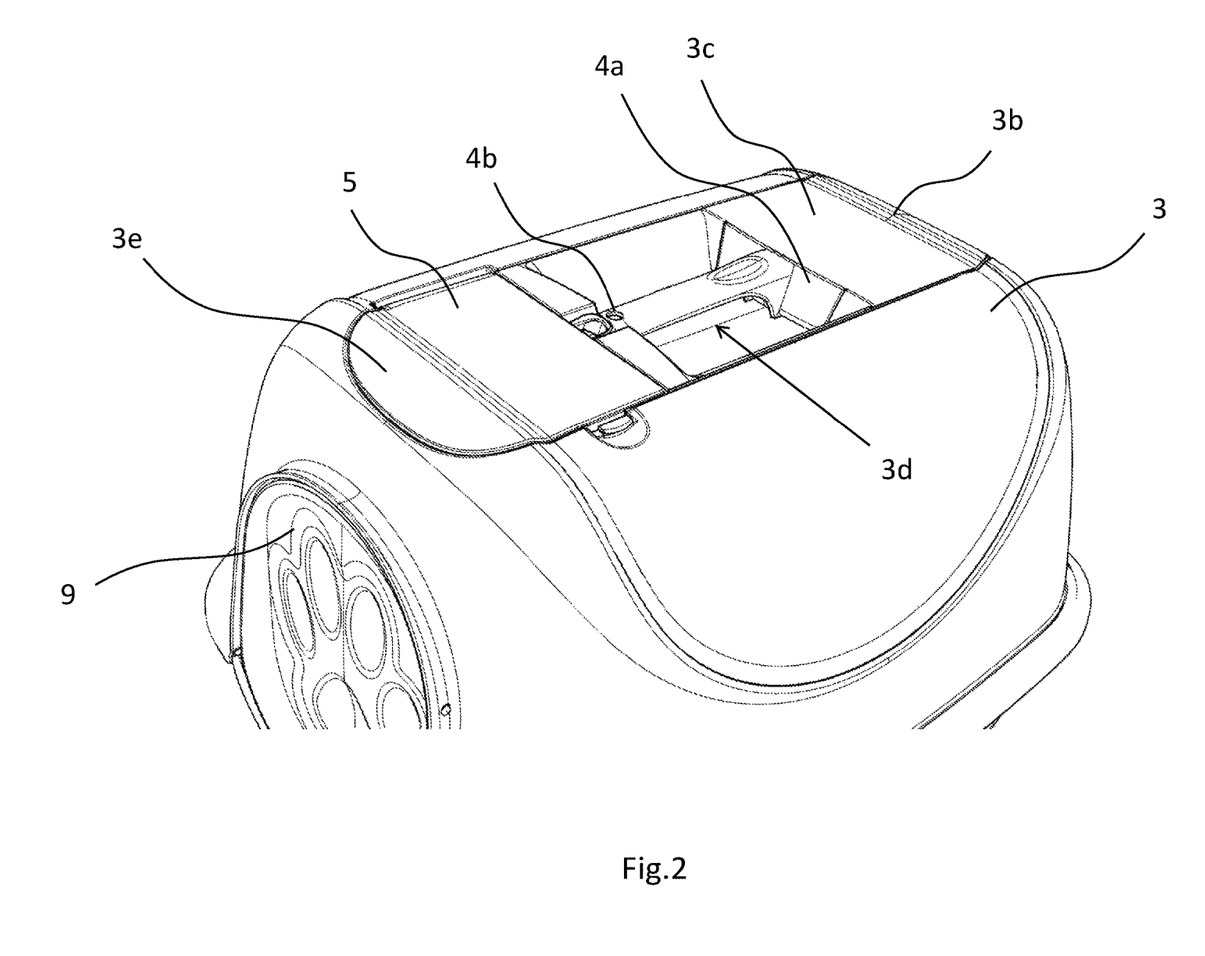
FIG. 2 shows a three-dimensional schematic view of an upper portion with multifunctional handle of the closed litter box for pets, according to the invention.

FIG. 2 shows, in detail, the top view of the upper module 3 of the litter box 1. In particular, the upper module comprises, at a first upper end 3b, a first region 3c internally hollow configured to house a collection portion 4a of a shovel 4 of products used to collect droppings from the animals housed in the litter box 1. In particular, the collection portion 4a of the shovel 4 is equipped with holes or slots for the selective collection of excreta from the litter.

Advantageously agglomerations containing excrement will be withheld from the collection portion 4a of the shovel 4 while the clean litter will fall in the lower module 2.

The upper module 3 further comprises a hollowed central region 3d configured to accommodate a handle 4b of the shovel 4 and to allow the hand of a user to fit into the central upper excavated region 3d and hold the handle 4b. Furthermore, the upper module 3 comprises, at a second upper end 3e opposite to the first upper end 3b, an internally hollow second region 3f provided with an openable lid 5 hinged on a specific portion of an upper edge 3g of the upper module 3.

In particular, advantageously according to the invention, the upper module 3 has a parallelepiped protrusion 3h interposed between the second internally hollow region 3f and the central excavated region 3d, comprising a central trench 3i configured to house a free end 4c of the handle 4b of the shovel 4.

In particular, according to a preferred embodiment, the central trench 3i has a snap-engagement such as to avoid that the free end 4c accidentally come out during a shift.

Figure 3:
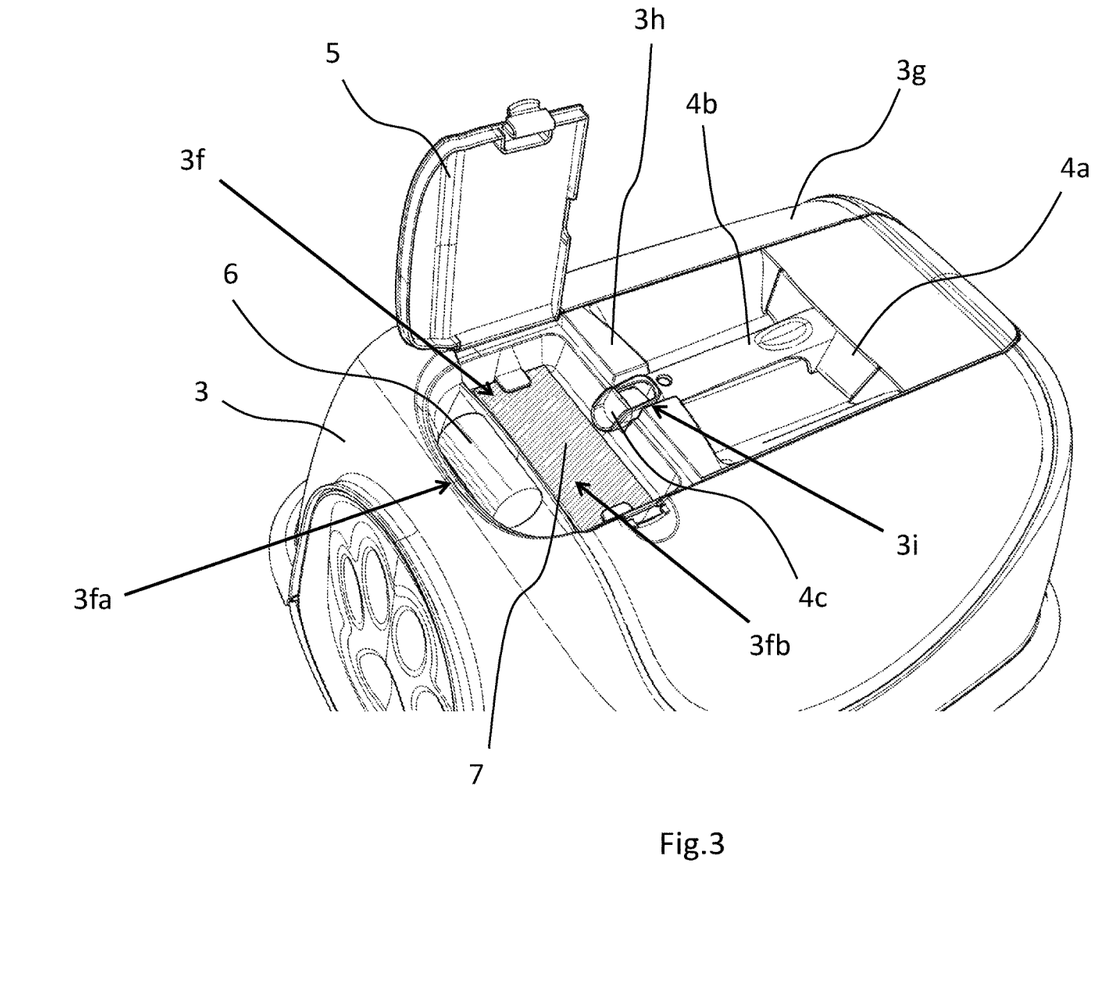
FIG. 3 shows a schematic three-dimensional view of the upper portion of FIG. 2 with a cover door of a filter and with a roll of bags for excrements, according to the invention.

Furthermore, as shown in FIG. 3, the second internally hollow region 3f comprises a first compartment 3fa configured to accommodate a roll 6 of bags for excrements and a second compartment 3fb configured for housing a filter for odors 7.

Figure 4:
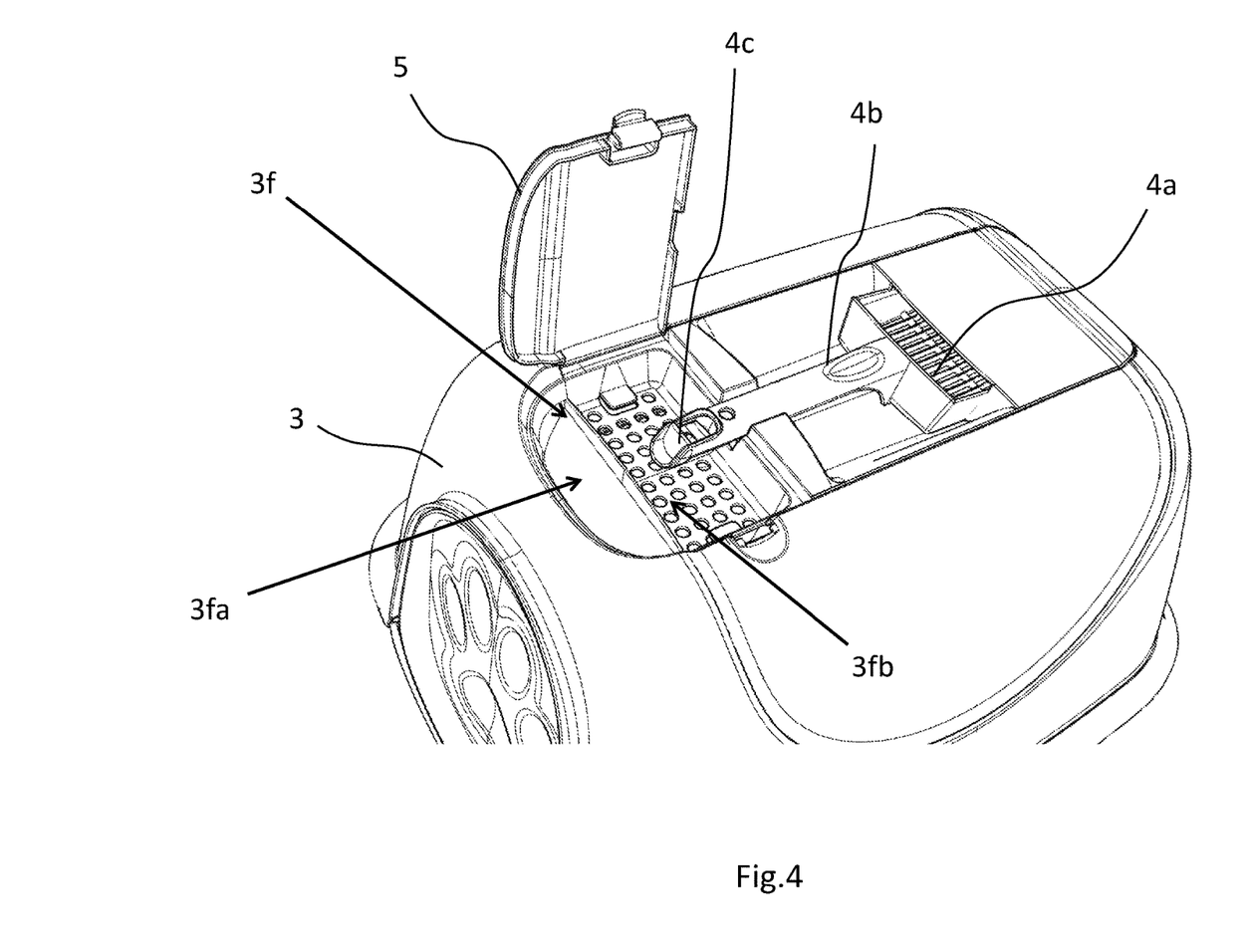
FIG. 4 shows a three-dimensional schematic view of the upper portion of FIG. 2 comprising a shovel having the multifunction handle of FIG. 2, according to the invention.
Figure 5:
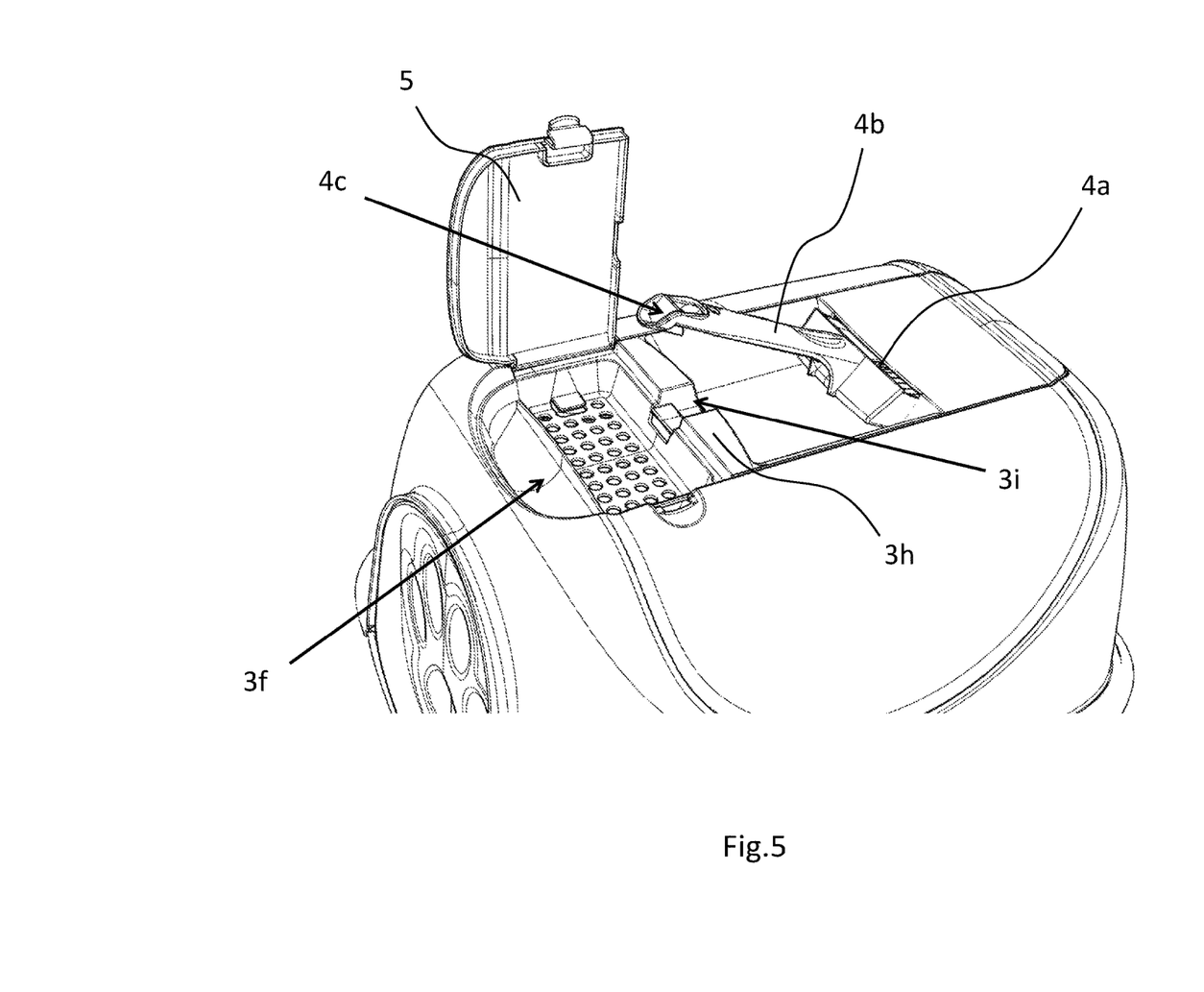
FIG. 5 shows a three-dimensional schematic view of the upper portion of FIG. 2 in a configuration in which the handle of the shovel is disengaged from its housing in the upper portion, according to the invention.
Figure 6:
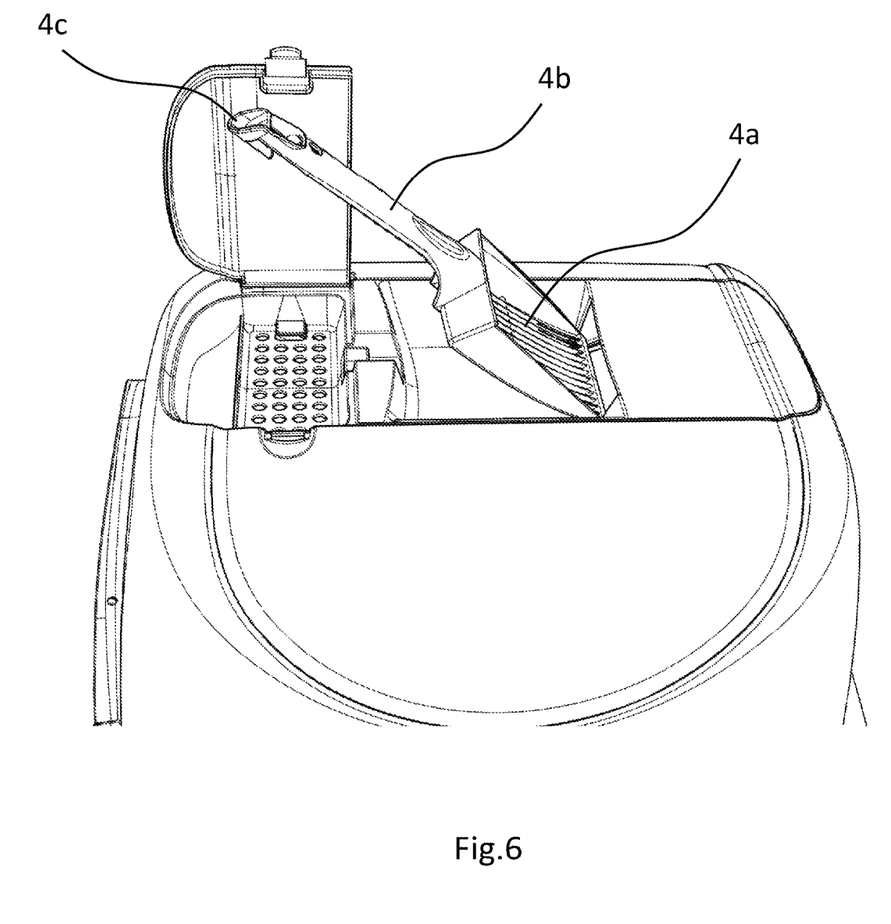
FIG. 6 shows a three-dimensional schematic view of the upper portion of FIG. 2 in a configuration in which the handle of the shovel is lifted from the upper portion, according to the invention.

FIGS. 4-6 show successive steps of the removal of the shovel 4 from its housing in the upper part of the upper module 3. In particular, FIG. 4 shows that the free end 4c of the handle 4b of the shovel 4 can be pulled, when the cover 5 is open, towards the second internally hollow region 3f, so that the collection portion 4a of the shovel 4 is extracted from the inside of the first internally hollow region 3c. Subsequently, as shown in FIG. 5, the handle 4b can be slide off from the central trench 3i of the parallelepiped protrusion 3h and raised to completely extract the shovel 4, as shown in FIG. 6.

In this way, the user of the litter box 1 can conveniently use, as handle of the transportable litter box 1, the handle 4b of the shovel 4, in the configuration in which the collection portion 4a of the shovel 4 is placed inside the first internally hollow region 3c and the end 4c end of its handle 4b is embedded in the trench 3 of the parallelepiped protrusion 3h.

Conveniently, the user, once having put the litter box 1 in the desired position, can extract the shovel 4 to provide for the cleaning of the litter box 1 itself, as shown in FIG. 7, simply decoupling the upper module 3 from the lower module 2 and collecting the produced excrement deposited in the lower module 2 filtering those with the shovel 4.

According to an aspect of the invention, a side portion 2b of the lower module 2 has a lowered edge 2c with respect to the upper edge 2a of the lower module 2, corresponding to a side portion 3l of the upper module 3 with the edge 3m raised with respect to the lower edge 3a of the upper module 3. In the coupling configuration of the lower module 2 with the upper module 3, the edge 2c and the edge 3m define an inlet 8 used to enable the input and the output of the animal in/from the litter box 1.

Advantageously according to the invention, the litter box 1 comprises means 9 for opening/closing the inlet 8, for example an overhead door 9 hinged to the sides of the edge 3m of the side portion 3l of the module 3.

Therefore, the closed litter box for pets according to the invention allows to use the handle of the shovel as a handle to open and move the litter box.

In addition, the closed litter box for pets according to the invention enables to use the shovel with a dual function allowing to reduce the components and the related costs.

Another advantage of the closed litter box for pets according to the invention is to be easily opened for cleaning.

Advantageously the handle of the shovel is provided with a snap coupling in the central excavation which prevents accidental discharge during a shift.

A further advantage of the closed litter box for pets according to the invention consists in being compact.

Furthermore, the closed litter box for pets according to the invention has a regular structure.

Another advantage of the closed litter box for pets according to the invention is to have integrated accessories just in the structure of the same litter box.

Finally, the closed litter box for pets according to the invention is low cost.

Finally, it is clear that the closed litter box for pets here described and illustrated may be subject to modifications and variations without thereby departing from the protective scope of the present invention, as defined in the appended claims.

The invention claimed is:

1. A closed litter box for pets comprising:
at least one lower module, configured for containing granular material for collection of excrement products;
at least one upper module coupled to said at least one lower module and configured for closing the at least one lower module, the at least one upper module includes a first internally hollow region at a first upper end and a second internally hollow region at a second upper end that is opposite to the first upper end;
an openable lid at the second internally hollow region, the openable lid movable between a closed position in which the openable lid restricts access to the second internally hollow region and an open position in which the openable lid permits access to the second internally hollow region; and
a removable shovel including a handle having a distal end and a collection portion at an end opposite to the distal end for collecting the excrement product;
wherein:
in a stowed position of the removable shovel, the collection portion is seated within the first internally hollow region, and the distal end of the handle is seated within the second internally hollow region beneath the openable lid such that the openable lid is on top of the distal end and the handle is immobile when the openable lid is closed;
the closed litter box can be lifted by the handle of the removable shovel when the removable shovel is in the stowed position; and
to move the removable shovel from the stowed position to a deployed position, the openable lid is opened to permit access to the distal end of the handle, the distal end of the handle is lifted out of the second internally hollow region, and the collection portion is removed out from within the first internally hollow region to configure the removable shovel for excrement collection.

2. The closed litter box for pets according to claim 1, wherein the at least one upper module comprises:
a centrally excavated region between said first upper end and said second upper end; and
a parallelepiped protrusion between the second internally hollow region and the excavated region, the parallelepiped protrusion including a central trench configured for housing portion of the handle adjacent the distal end of the removable shovel.

3. The closed litter box for pets according to claim 1, wherein the second internally hollow region comprises a first compartment configured for housing a roll of bags for the excrement products and a second compartment configured for housing a filter for odors.

4. The closed litter box for pets according to claim 1, wherein the at least one lower module is provided with an upper edge having a shape so as to be a mirror image in negative of a shape of a lower edge of the at least one upper module, so as to make possible a latch locking blocking of the lower edge on the upper edge.

5. The closed litter box for pets according to claim 1, wherein at least one side portion of the at least one lower module has a lowered edge lowered with respect to an upper edge of the at least one lower module, the at least one upper module has at least one side portion having a raised edge raised with respect to a lower edge of the at least one upper module, and the raised and lowered edges together define, in a coupling configuration of the at least one lower module with the at least one upper module, an inlet suitable for allowing entry and exit of an animal in or from the closed litter box for pets.

6. The closed litter box for pets according to claim 5, further comprising means for closing or opening the inlet.

7. The closed litter box for pets according to claim 6, wherein the means for closing or opening of the inlet is an overhead door hinged to sides of the raised edge of the at least one side portion of the at least one upper module.

8. A closed litter box for pets comprising:
a lower module configured to house therein granular material for collection of excrement;
an upper module configured to couple with the lower module to close the lower module;
a centrally excavated region defined at an upper end of the upper module;
a first internally hollow region at a first end of the centrally excavated region, the first internally hollow region partially defined by an outer cover;
a second internally hollow region at a second end of the centrally excavated region, the second internally hollow region partially defined by an openable lid;
a shovel including a handle and a collection portion for collecting the excrement, the handle has a distal end and a middle portion between the distal end and the collection portion;
wherein:
in a stowed position of the shovel, the collection portion is seated within the first internally hollow region, the middle portion of the handle is seated within the centrally excavated region such that the middle portion is outside of the second internally hollow region, and the distal end of the handle is seated within the second internally hollow region beneath the openable lid such that the openable lid is on top of the distal end and the handle is immobile when the openable lid is closed;
when the shovel is in the stowed position, the closed litter box can be lifted with the middle portion of the handle; and
to move the shovel from the stowed position to a deployed position, the openable lid is opened to permit access to the distal end of the handle, the distal end of the handle is lifted out of the second internally hollow region, the middle portion of the handle is lifted out of the centrally excavated region, and the collection portion is removed out from within the first internally hollow region to configure the removable shovel for excrement collection.

\* \* \* \* \*